United States Patent [19]

Chou

[11] 4,431,616

[45] Feb. 14, 1984

[54] METHOD OF REMOVING HYDROGEN SULFIDE FROM GASES

[75] Inventor: Charles C. Chou, Houston, Tex.

[73] Assignee: Shell Oil Company, Houston, Tex.

[21] Appl. No.: 452,342

[22] Filed: Dec. 22, 1982

Related U.S. Application Data

[63] Continuation of Ser. No. 337,209, Jan. 6, 1982, abandoned.

[51] Int. Cl.³ .............................................. B01D 53/34
[52] U.S. Cl. .................................... 423/226; 423/224; 423/578 R; 423/573 G
[58] Field of Search ............... 423/224, 226, 228, 229, 423/573 G, 573 R, 578 R

[56] References Cited

U.S. PATENT DOCUMENTS

| | | | |
|---|---|---|---|
| 3,068,065 | 12/1962 | Hartley et al. | 423/228 |
| 3,226,320 | 12/1965 | Meuly et al. | 423/224 X |
| 3,933,993 | 1/1976 | Solemme | 423/226 X |
| 4,009,251 | 2/1977 | Meuly | 423/573 G |
| 4,091,073 | 5/1978 | Winkler | 423/573 G X |

*Primary Examiner*—Earl C. Thomas
*Attorney, Agent, or Firm*—Albert J. Adamcik

[57] ABSTRACT

An improved process for the removal of $H_2S$ from sour gas streams in which the $H_2S$ is converted to sulfur by a polyvalent metal chelate solution is disclosed, the process being characterized by the washing of the product sulfur with an aqueous wash solution, and recovery of the acid precursor of the chelating agent from the washing solution.

12 Claims, No Drawings

METHOD OF REMOVING HYDROGEN SULFIDE FROM GASES

This is a continuation of application Ser. No. 337,209, filed Jan. 6, 1982, and now abandoned.

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior or subsequent to regeneration. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

In yet another process, e.g., that disclosed in U.S. Pat. No. 4,091,073, issued May 23, 1978, to Winkler, $CO_2$ present in the gaseous stream is also removed by the use of a suitable selective absorbent.

Because these "cleanup" processes generally represent significant costs to manufacturing operations, any improvements in such processes which increase their efficiency may have great economic importance. For example, where ligands or chelates of polyvalent metal chelates are employed, degradation or decomposition of the polyvalent metal chelates represents an important cost in the process, as well as requiring measures for decomposition product bleed or removal and addition of fresh solution. Even in the case of preferred chelates such as those of 2-(n-hydroxyethyl) ethylene diaminetriacetic acid and nitrilotriacetic acid, ligand decomposition, over a period of time, requires attention to prevent build-up of decomposition products and consequent loss of efficiency. As will be recognized, the bleed from the process contains, along with the decomposition products, a considerable amount of the valuable polyvalent metal chelates. In one proposed process, as described in an application by Lutz, entitled Complexing Acid Recovery, filed even date herewith, and whose disclosure is incorporated herein by reference, a bleed stream or streams from the process are treated to recover the valuable chelating agent. The present invention represents an additional approach to recovery of the valuable chelating agent.

SUMMARY OF THE INVENTION

Accordingly, the invention, in one embodiment, relates to a process for the removal of $H_2S$ from a sour gaseous stream comprising:

(a) contacting the sour gaseous stream in a contacting zone with an aqueous reaction solution at a temperature below the melting point of sulfur, the reaction solution comprising an effective amount of an oxidizing reactant selected from the group consisting of oxidizing polyvalent metal chelates of nitrilotriacetic acid, and mixtures thereof, and producing a sweet gas stream and an aqueous admixture containing sulfur, reduced reactant, and decomposition products of said reactant;

(b) removing aqueous admixture from the contacting zone, and removing solid sulfur containing residual aqueous admixture from said aqueous admixture;

(c) regenerating said aqueous admixture, producing a regenerated oxidizing reactant solution, and returning regenerated oxidizing reactant solution to the contacting zone;

(d) concomitantly washing solid sulfur from step (b) with an aqueous washing liquid and producing improved sulfur and an aqueous solution containing a polyvalent metal chelate of nitrilotriacetic acid, or mixtures thereof;

(e) contacting aqueous solution produced in step (d) with a sufficient amount of a specified acid or acids to dissociate at least the bulk of the polyvalent metal chelate or chelates in solution and under conditions to precipitate a solid containing nitrilotriacetic acid, and precipitating said solid. As used herein, the term "under conditions to precipitate a solid" and variants thereof merely implies the use temperatures at which the acid exceeds its solubility in the solution or admixture treated. Such conditions may inhere in the steps performed, or may be accomplished simply by cooling.

The precipitate is then easily separated, and may be processed in a number of ways, as set forth more fully hereinafter.

In a second embodiment, the aqueous admixture is regenerated first to produce a regenerated oxidizing reactant solution, solid sulfur containing residual oxidizing reactant solution is separated from the regenerated oxidizing reactant solution and washed with an aqueous washing solution to produce an aqueous solution containing the regenerated polyvalent metal chelate of nitrilotriacetic acid (or mixtures thereof), and the aqueous solution is treated with the acid or acids, as described, supra, to precipitate a solid containing the nitrilotriacetic acid.

In third and fourth embodiments of the invention, the aqueous admixture, either before or after regeneration, is separated into an aqueous reactant solution having reduced sulfur content, and an aqueous reactant slurry containing increased sulfur content, solid sulfur containing residual aqueous admixture is recovered from the slurry, and solid slurry containing the residual aqueous admixture is washed, etc., as described in conjunction with the first and second embodiment. In essence, the crux of the invention arises from the recognition that the polyvalent metal chelate or chelates in the aqueous admixture remaining on or occluded in the solid sulfur removed may be successfully recovered by washing the sulfur and treating the wash solution, as described, with the specified acid or acids.

Finally, the invention encompasses treating sour gaseous streams which contain $H_2S$ and significant quantities of $CO_2$, in the manner described. More particularly, a sour gas stream containing $H_2S$ and $CO_2$ is contacted with a selective absorbent-aqueous reactant mixture at a temperature below the melting point of sulfur, the reactant mixture and procedure being similar to that described, supra. Broadly, this is accomplished by the use of an absorbent mixture containing a selective absorbent for $CO_2$ (and preferably for $H_2S$, as well), and an effective amount of an oxidizing polyvalent metal chelate of nitrilotriacetic acid, and mixtures thereof. A purified or "sweet" gaseous stream is produced which meets general industrial and commercial $H_2S$ and $CO_2$ specifications. The $CO_2$ is absorbed and the $H_2S$ is immediately converted to sulfur by the polyvalent metal chelate, etc. In the process, the reactant is reduced, and the sulfur may be treated, as described, supra. The sulfur may be removed prior or subsequent to regeneration of the admixture.

DETAILED DESCRIPTION OF THE INVENTION

The particular type of gaseous stream treated is not critical, as will be evident to those skilled in the art. Streams particularly suited to removal of $H_2S$ by the practice of the invention are, as indicated, naturally-occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbons streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the practice of the invention. The $H_2S$ content of the type of streams contemplated will vary extensively, but, in general, will range from about 0.1 percent to about 10 percent by volume. $CO_2$ content may also vary, but may range from about 0.5 percent to about 95 percent or greater by volume. Obviously, the amounts of $H_2S$ and $CO_2$ present are not generally a limiting factor in the practice of the invention.

The temperatures employed in the contacting or absorption-contact zone are not generally critical, except that the reaction is carried out below the melting point of sulfur, and, if an absorbent is used, the temperatures employed must permit acceptable absorption of $CO_2$. In many commercial applications, such as the removal of $H_2S$ and $CO_2$ from natural gas to meet pipeline specifications, absorption at ambient temperatures is desired, since the cost of refrigeration would exceed the benefits obtained due to increased absorption at the lower temperature. In general, temperatures from 10° C. to 80° C. are suitable, and temperatures from 20° C. to 60° C. are preferred. Contact times will range from about 1 second to about 120 seconds, with contact times of 2 seconds to 60 seconds being preferred.

Similarly, in the regeneration or stripping zone or zones, temperatures may be varied widely. Preferably, the regeneration zone should be maintained at substantially the same temperature as the contacting zone. If heat is added to assist regeneration, cooling of the aqueous admixture is required before return of the admixture to the contacting zone. In general, temperatures of from about 10° C. to 80° C., preferably 20° C. to 40° C., may be employed.

Pressure conditions in the contacting or absorption zone may vary widely, depending on the pressure of the gas to be treated. For example, pressures in the contact zone may vary from one atmosphere up to one hundred fifty or even two hundred atmospheres. Pressures of from one atmosphere to about one hundred atmospheres are preferred. In the regeneration or desorption zone or zones, pressures may also be varied considerably, and will preferably range from about 0.5 atmosphere to about three of four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al., dated Dec. 11, 1962, and U.S. Pat. No. 4,009,251, to Meuly, issued Feb. 22, 1977, which disclosures are incorporated herein by reference. Preferably, if the iron chelate of nitrilotriacetic acid is used, pH in the process of the invention will range from about 6 to about 7.5, and the molar ratio of the nitrilotriacetic acid to the iron about 1.2 to 1.6. The procedure is preferably conducted continuously.

As indicated, the invention provides, in each embodiment, for the regeneration of the reactant and the absorbent. Preferably, the loaded absorbent mixture and the reduced polyvalent metal chelate, or mixtures thereof, are regenerated by contacting the mixture in a regeneration zone or zones with oxygen. As used herein, the term "oxygen" includes oxygen-containing gases such as air, or air-enriched with oxygen. If significant quantities of $CO_2$ or other gases have been absorbed, the reactant-containing solution is preferably treated, such as by heating or pressure reduction, to remove the bulk of the $CO_2$ or other gases before regeneration of the reactant (either prior or subsequent to sulfur removal). Alternately, or if small quantities of $CO_2$ are obsorbed, the $CO_2$ may simply be stripped in the regeneration zone.

As noted, the regeneration of the reactant is preferably accomplished by the utilization of oxygen, preferably as air. The oxygen will accomplish two functions, the oxidation of the reactant to its higher valence state, and the stripping of any residual $CO_2$ (if originally present) from the absorbent mixture. The oxygen (in whatever form supplied) is supplied in a stoichiometric equivalent or excess with respect to the amount of reduced metal ion of the chelate or chelates present in the mixture. Preferably, the oxygen is supplied in an amount from about 0.5 to 3 times excess.

As indicated, the $H_2S$, when contacted, is rapidly converted in the process of the invention by the oxidizing polyvalent metal chelate of nitrilotriacetic acid, or mixtures thereof, to elemental sulfur. since the polyvalent metal chelates employed in the invention have limited solubility in many solvents or absorbents, if an absorbent is used, the polyvalent metal chelates are preferably supplied in admixture with the liquid absorbent and water. The manner of preparing the admixture containing an absorbent is a matter of choice. For example, the chelate may be added to the absorbent, and, if necessary, then water added. The amount of water added will normally be just that amount necessary to achieve solution of the polyvalent metal chelate, and can be determined by routine experimentation. Since the polyvalent metal chelate may have a significant solubility in the solvent, and since water is produced by the reaction of the $H_2S$ and the ions of chelate, precise amounts of water to be added cannot be given. In the case of absorbents having a low solubility for the polyvalent metal chelate, approximately 5 percent to 10 percent water by volume, based on the total volume of the absorbent mixture, will generally provide solvency. Preferably, however, the polyvalent metal chelate or chelates are added as an aqueous solution to the liquid absorbent. Where the reactant is supplied as an aqueous solution, the amount of solution supplied may be about 20 percent to about 80 percent by volume of the total absorbent admixture supplied to the absorption zone. A polyvalent metal chelate solution will generally be supplied as an aqueous solution having a concentration of from about 0.1 molar to about 2 molar, and a concentration of about 0.5 molar is preferred.

If an absorbent is employed, it is selected from those absorbents which have a high degree of selectivity in absorbing $CO_2$ (and preferably $H_2S$ as well) from the gaseous streams. Any of the known absorbents conventionally used (or mixtures thereof) which do not affect the activity of the polyvalent chelate, or mixtures thereof, and which exhibit sufficient solubility for the reactant or reactants may be employed. As indicated, the absorbent preferably has good absorbency for $H_2S$ as well, in order to assist in the removal of any $H_2S$ present in the gaseous streams. The particular absorbent chosen is a matter of choice, given these qualification, and selection can be made by routine experimentation. For example, diethylene glycol ethyl mono-ether, propylene carbonate, tetraethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art.

The oxidizing polyvalent metal chelates of nitrilotriacetic acid, and mixtures thereof, may be used in the process of the invention. The chelates of iron, copper, and manganese are preferred, particularly iron. The polyvalent metal chelates are readily formed in aqueous solution by reaction of an appropriate salt, oxide or hydroxide of the polyvalent metal and the nitrilotriacetic acid in the acid form or an alkali metal or ammonium salt thereof. The $H_2S$, when contacted, is quickly converted by the polyvalent metal chelate, etc., to elemental sulfur. The amount of polyvalent chelate, or mixtures thereof, supplied is an effective amount, i.e., an amount sufficient to convert all or substantially all of the $H_2S$ in the gas stream, and will generally be on the order of at least about one mol per mol of $H_2S$. Ratios of from about 1 or 2 mol to about 15 mols of polyvalent metal compound or chelate per mol of $H_2S$ may be used, with ratios of from about 2 mols per mol to about 5 mols of polyvalent metal chelate per mol of $H_2S$ being preferred. The manner of preparing the aqueous solution or admixture is a matter of choice.

As indicated, a critical feature of the invention is the recovery of nitrilotriacetic acid from the residual or occluded admixture containing polyvalent chelate or chelates from the sulfur removed from the process. Those skilled in the art will recognize that such admixture contains decomposition products of the chelate or chelates chosen, and it is an advantage of the invention that these decomposition products may be removed during the recovery of the desired chelating acid. In some instances, the wash procedure of the invention will be sufficient "bleed" of decomposition products from the overall process that no further removal of such products is required. Those skilled in the art will recognize, that, if the sulfur is washed prior to regeneration, both the $Fe^{+++}$ and $Fe^{++}$ chelate or chelates will be recovered in the wash solution.

More particularly, the sulfur produced in the process is removed from the aqueous admixture. The sulfur may, as indicated, be removed at any point in the process, although removal of the sulfur, per se, from the contact zone is not praticularly desirable. In any event, sulfur removal is preferably accomplished after removal of spent or partially spent admixture or solution is removed from the contact zone, and may be accomplished before or after regeneration. The sulfur may be removed from a portion, preferably a major portion of the stream leaving the contact or regeneration zone, the balance of the stream being processed as indicated hereinafter. In this connection, it is not necessary that absolutely all sulfur be removed on a continuous basis in the process; the process may suitably be operated with a very minor inventory or significantly reduced content of sulfur in the system. In any event, the manner of recovering the sulfur is a matter of choice. For example, the sulfur may be recovered by settling, filtration, or by suitable devices such as a hydroclone. Moreover, it may be advantageous to concentrate the sulfur first in a portion of the admixture, either before or after regeneration. For example, the sulfur-containing admixture from the contacting zone (or from the regeneration zone) may be separated into two portions, a portion or stream having reduced sulfur content, and a portion or stream containing increased sulfur content, preferably a slurry. The manner of separation is a matter of choice, and equipment such as a hydroclone or a centrifugal separator may be employed. If a slurry is produced, the "slurry" or concentrated stream will comprise 2 percent to 30 percent, by volume, (on a continuous basis) of the total stream from the contact or regeneration zone. In the case where a slurry is produced, the slurry may be filtered or subjected to further treatment to remove the sulfur, and the recovered admixture may be returned to the process, suitably for regeneration.

In any event, the sulfur separated from the admixture is contacted with a suitable aqueous wash liquid. Cool or warm water is preferable, and the water may contain other solubilizing components, such as minor amounts of alkali metal ions. However, since the next step in the process is to acidify the wash liquid, the use of such materials should be minimized. Whatever wash is used, the sulfur is washed, in any suitable fashion, and the residual polyvalent metal chelate is removed in solution. Any suitable means of washing the sulfur is acceptable. For example, if the sulfur has been filtered from the aqueous admixture, an aqueous wash liquid may simply be washed through the precipitate mass. Obviously, the volume of wash liquid sould be limited to that amount needed to recover the optimum amount of chelate, since later acidulation of large volumes of liquid would reduce the economic value of the recovery.

Accordingly, the wash liquid is contacted with a specified acid or acids. Suitable acids are selected from $H_2SO_4$, HCl, $H_3PO_4$, and mixtures thereof. The acid or acids are supplied in an amount sufficient to dissociate at least the bulk of the polyvalent metal complex or complexes in the wash liquid or solution and precipitate the solid nitrilotriacetic acid. In general, sufficient acid should be supplied to lower the pH of the wash solution to about 1 to 3. This amount, of course, may be determined by experimentation. If necessary, the temperature may be lowered to cause or enhance the precipitation of the solid containing the acid. The precipitated solid may be separated by any suitable means, such as by filtration, and the supernatant liquid or solution may be recovered or sent to waste treatment. Although minor amounts of decomposition products of the chelates will also precipitate, the great bulk of the solid or precipitate will comprise the desired nitrilotriacetic acid. The acid may suitably be treated with an alkali metal or ammonium hydroxide, and may be recomplexed, as described, supra, with a polyvalent metal, for reuse in the process. Alternately, after washing, the acid may be returned directly to the process stream if suitable amounts of iron are added to the stream.

What is claimed is:

1. A process for the removal of $H_2S$ from a sour gaseous stream comprising
   (a) contacting the sour gaseous stream in a contacting zone with an aqueous reaction solution at a temperature below the melting point of sulfur, the reaction solution comprising an effective amount of an oxidizing reactant selected from the group consisting of oxidizing polyvalent metal chelates of nitrilotriacetic acid, and mixtures thereof, and producing a sweet gas stream and an aqueous admixture containing sulfur, reduced reactant, and decomposition products of said reactant;
   (b) removing aqueous admixture from the contacting zone, and removing solid sulfur containing residual aqueous admixture from said aqueous admixture;
   (c) regenerating said aqueous admixture, producing a regenerated oxidizing reactant solution, and returning regenerated oxidizing reactant solution to the contacting zone;
   (d) concomitantly washing solid sulfur from step (b) with an aqueous washing liquid and producing improved sulfur and an aqueous solution containing a polyvalent metal chelate of nitrilotriacetic acid, or mixtures thereof;
   (e) contacting aqueous solution produced in step (d) with sufficient acid selected from the group consisting of HCl, $H_2SO_4$, $H_3PO_4$, and mixtures thereof, to dissociate at least the bulk of the polyvalent metal chelate or chelates in solution and under conditions to precipitate a solid containing nitrilotriacetic acid, and precipitating and recovering said solid.

2. The process of claim 1 wherein the solid precipitated is neutralized with a basic material selected from alkali metal hydroxides and ammonium hydroxide.

3. The process of claim 1 wherein the oxidizing reactant is the $Fe+++$ chelate of nitrilotriacetic acid.

4. A process for the removal of $H_2S$ from a sour gaseous stream comprising
   (a) contacting the sour gaseous stream in a contacting zone with an aqueous reaction solution at a temperature below the melting point of sulfur, the reaction solution comprising an effective amount of an oxidizing reactant selected from the group consisting of oxidizing polyvalent metal chelates of nitrilotriacetic acid, and mixtures thereof, and producing a sweet gas stream and an aqueous admixture containing solid sulfur, reduced reactant, and decomposition products of said reactant;
   (b) removing aqueous admixture from the contacting zone;
   (c) regenerating said aqueous admixture and producing a regenerated aqueous oxidizing reactant solution containing solid sulfur;
   (d) removing solid sulfur containing residual aqueous oxidizing reactant solution from regenerated solution from step (c), and returning regenerated aqueous reaction solution having reduced sulfur content to the contacting zone;
   (e) concomitantly washing solid sulfur from step (d) with an aqueous washing liquid and producing improved sulfur and an aqueous solution containing a regenerated polyvalent metal chelate of nitrilotriacetic acid, or mixtures thereof;
   (f) contacting aqueous solution produced in step (e) with sufficient acid selected from the group consisting of HCl, $H_2SO_4$, $H_3PO_4$, and mixtures thereof, to dissociate at least the bulk of the polyvalent metal chelate or chelates in solution and under conditions to precipitate a solid containing nitrilotriacetic acid, and precipitating and recovering said solid.

5. The process of claim 4 wherein the solid precipitated is neutralized with a basic material selected from alkali metal hydroxides and ammonium hydroxide.

6. The process of claim 4 wherein the oxidizing reactant is the $Fe+++$ chelate of nitrilotriacetic acid.

7. A process for the removal of $H_2S$ from a sour gaseous stream comprising
   (a) contacting the sour gaseous stream is a contacting zone with an aqueous reaction solution at a temperature below the melting point of sulfur, the reaction solution comprising an effective amount of oxidizing polyvalent metal chelates of nitrilotriacetic acid, and mixtures thereof, and producing a sweet gas stream and an aqueous admixture containing sulfur, reduced reactant, and decomposition products of said reactant;
   (b) removing aqueous admixture from the contacting zone;
   (c) separating removed aqueous admixture into an aqueous reactant solution having reduced sulfur content and an aqueous reactant slurry containing increased sulfur content;
   (d) regenerating said aqueous reactant solution, and returning regenerated reactant solution to the contacting zone;
   (e) concomitantly recovering solid sulfur containing residual aqueous admixture from said aqueous reactant slurry;
   (f) washing solid sulfur from step (e) with an aqueous wash and producing improved sulfur and an aqueous solution containing a polyvalent metal chelate of nitrilotriacetic acid, or mixtures thereof;
   (g) contacting aqueous solution produced in step (f) with sufficient acid selected from the group consisting of HCl, $H_2SO_4$, $H_3PO_4$, and mixtures thereof, to dissociate at least the bulk of the polyvalent metal chelate or chelates in solution and under conditions to precipitate a solid containing nitrilotriacetic acid, and precipitating and recovering said solid.

8. The process of claim 5 wherein the solid precipitated is neutralized with a basic material selected from alkali metal hydroxides and ammonium hydroxide.

9. The process of claim 7 wherein the oxidizing reactant is the $Fe+++$ chelate of nitrilotriacetic acid.

10. A process for the removal of $H_2S$ from a sour gaseous stream comprising
    (a) contacting the sour gaseous stream in a contacting zone with an aqueous reaction solution at a temperature below the melting point of sulfur, the reaction solution comprising an effective amount of an oxidizing reactant selected from the group consisting of oxidizing polyvalent metal chelates of nitrilotriacetic acid, and mixtures thereof, and producing a sweet gas stream and an aqueous admixture containing sulfur, reduced reactant, and decomposition products of said reactant;

(b) removing aqueous admixture from the contacting zone; regenerating said aqueous admixture and producing a regenerated aqueous oxidizing reactant solution containing solid sulfur;

(c) separating regenerated oxidizing reactant solution containing solid sulfur into a regenerated aqueous reaction solution having reduced sulfur content and an aqueous reactant slurry containing increased sulfur content, and returning the regenerated aqueous reaction solution to the contacting zone;

(d) concomitantly recovering solid sulfur containing residual aqueous admixture from aqueous reactant slurry from step (c);

(e) washing solid sulfur from step (d) with an aqueous washing liquid and producing improved sulfur and an aqueous solution containing the polyvalent metal chelate of nitrilotriacetic acid, or mixtures thereof;

(f) contacting aqueous solution produced in step (e) with sufficient acid selected from the group consisting of HCl, $H_2SO_4$, $H_3PO_4$, and mixtures thereof, to dissociate at least the bulk of the polyvalent metal chelate or chelates in solution and under conditions to precipitate a solid containing nitrilotriacetic acid, and precipitating and recovering said solid.

11. The process of claim 10 wherein the oxidizing reactant is the $Fe^{+++}$ chelate of nitrilotriacetic acid.

12. The process of claim 10 wherein the solid precipitated is neutralized with a basic material selected from alkali metal hydroxides and ammonium hydroxide.

* * * * *